(12) United States Patent
Tsuboi et al.

(10) Patent No.: US 10,852,255 B2
(45) Date of Patent: Dec. 1, 2020

(54) X-RAY IMAGING SYSTEM

(71) Applicant: Konica Minolta Inc., Tokyo (JP)

(72) Inventors: Yasunori Tsuboi, Hino (JP);
Mitsuharu Kitamura, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 42 days.

(21) Appl. No.: 16/205,766

(22) Filed: Nov. 30, 2018

(65) Prior Publication Data

US 2019/0170666 A1    Jun. 6, 2019

(30) Foreign Application Priority Data

Dec. 4, 2017 (JP) .................. 2017-232259

(51) Int. Cl.
| | |
|---|---|
| *G01N 23/041* | (2018.01) |
| *G01N 23/20* | (2018.01) |
| *G21K 1/06* | (2006.01) |
| *G01N 23/04* | (2018.01) |

(52) U.S. Cl.
CPC .......... *G01N 23/041* (2018.02); *G01N 23/04* (2013.01); *G01N 23/20075* (2013.01); *G21K 1/06* (2013.01); *G01N 2223/1016* (2013.01); *G01N 2223/30* (2013.01); *G01N 2223/309* (2013.01); *G21K 2207/005* (2013.01)

(58) Field of Classification Search
CPC ................. G01N 23/041; G01N 23/04; G01N 23/20075; G01N 2223/1016; G01N 2223/30; G01N 2223/309; G21K 2207/005; G21K 1/06

USPC .......................................................... 378/36
See application file for complete search history.

(56) References Cited

U.S. PATENT DOCUMENTS

| | | | | |
|---|---|---|---|---|
| 2003/0084512 | A1* | 5/2003 | Fujita .................. | A61B 6/0421 5/601 |
| 2003/0205176 | A1* | 11/2003 | Kolody .................... | F16B 2/10 108/28 |
| 2009/0185663 | A1* | 7/2009 | Gaines, Jr. ........... | A61B 6/0457 378/209 |
| 2010/0067648 | A1* | 3/2010 | Kojima ................ | A61B 6/0414 378/11 |

(Continued)

FOREIGN PATENT DOCUMENTS

| | | |
|---|---|---|
| JP | 08-020383 | 3/1996 |
| JP | 4445397 | 4/2010 |

*Primary Examiner* — Taeho Jo
(74) *Attorney, Agent, or Firm* — Rankin, Hill & Clark LLP

(57) ABSTRACT

An X-ray imaging system includes: an X-ray Talbot imaging device that has an object table, an X-ray source, a plurality of gratings, and an X-ray detector, and irradiates the X-ray detector with an X-ray from the X-ray source through an object and the plurality of gratings to acquire a moiré image necessary for generation of a reconstructed image of the object; and a tester that is installed on the object table, holds the object, and loads a tensile load or a compressive load on the object, wherein the X-ray Talbot imaging device includes a hardware processor that causes a series of imaging to be performed to acquire the moiré image, the tester includes: a base part; and a chuck, and an operation of the chuck is automatically controllable by the hardware processor in conjunction with the X-ray Talbot imaging device.

17 Claims, 6 Drawing Sheets

(56) References Cited

U.S. PATENT DOCUMENTS

| | | | |
|---|---|---|---|
| 2010/0119041 A1* | 5/2010 | Ohara | A61B 6/484 378/87 |
| 2010/0234727 A1* | 9/2010 | Yoshizawa | A61B 5/4312 600/431 |
| 2010/0290585 A1* | 11/2010 | Eliasson | A61B 6/0435 378/37 |
| 2011/0071388 A1* | 3/2011 | Yared | A61B 6/508 600/425 |
| 2011/0073736 A1* | 3/2011 | Wang | A61B 6/4429 248/343 |
| 2011/0200177 A1* | 8/2011 | Patton | A61B 6/0485 378/208 |
| 2012/0183127 A1* | 7/2012 | Neushul | A61B 6/0442 378/209 |
| 2013/0129047 A1* | 5/2013 | Lim | A61B 6/04 378/62 |
| 2013/0165765 A1* | 6/2013 | Nishihara | A61B 8/0825 600/407 |
| 2013/0201198 A1* | 8/2013 | Nagatsuka | A61B 6/463 345/581 |
| 2014/0079182 A1* | 3/2014 | Roudergues | A61B 6/04 378/41 |
| 2014/0334605 A1* | 11/2014 | Ookawa | H05K 13/082 378/62 |
| 2016/0064109 A1* | 3/2016 | Yamaguchi | G21K 1/025 378/36 |
| 2016/0158082 A1* | 6/2016 | Gainor | A61G 7/05 5/690 |
| 2016/0213543 A1* | 7/2016 | Hafner | A61G 13/1205 |
| 2016/0338659 A1* | 11/2016 | Hoshino | A61B 6/032 |
| 2016/0374631 A1* | 12/2016 | Hoshino | A61B 6/4035 378/36 |
| 2017/0089506 A1* | 3/2017 | Okwudire | F16M 11/18 |
| 2017/0343494 A1* | 11/2017 | Hoshino | A61B 6/4035 |

* cited by examiner

X-RAY IMAGING SYSTEM

The entire disclosure of Japanese patent Application No. 2017-232259, filed on Dec. 4, 2017, is incorporated herein by reference in its entirety.

BACKGROUND

Technological Field

The present invention relates to an X-ray imaging system provided with an X-ray Talbot imaging device.

Description of the Related Art

Conventionally, X-ray fluoroscopic material testers for observing a dynamic behavior inside industrial material such as metal-type, polymer-type, ceramic-type, or composite material, or biomaterial under a stress in which a tensile/compressive load is applied to the material are known (for example, see JP 8-20383 B).

Further, conventionally, X-ray imaging devices using a Talbot interferometer or a Talbot-Lau interferometer having a plurality of gratings are known as X-ray imaging devices (hereinafter referred to as X-ray Talbot imaging devices). Then, to obtain a high-resolution reconstructed image by an X-ray Talbot imaging device, a fringe scanning method of performing reconstruction using images (moiré images) obtained by moving one of a plurality of gratings in a slit period direction by 1/M of a slit period of the gratings at a time (M is a positive integer, and M>2 for absorption images and M>3 for differential phase images and small angle scattering images) and imaging the grating M times (for example, see JP 4445397 B). Further, a Fourier transform method of reconstructing and generating an image such as a differential phase image by imaging one moiré image by an X-ray Talbot imaging device in a state where an object exists and performing Fourier transform or the like for the moiré image in image processing can also be used.

According to the X-ray Talbot imaging device as described in JP 4445397 B, images that cannot be captured by normal X-ray imaging devices including the X-ray fluoroscopic material tester as described in JP 8-20383 B can be captured. Therefore, there has been a demand to capture an object by an X-ray Talbot imaging device under a stress in which a tensile/compressive load is applied.

By the way, normal X-ray imaging devices including the X-ray fluoroscopic material tester as described in JP 8-20383 B have advantages of a shorter imaging time and a smaller influence of vibration or deformation of the object on a captured image than the X-ray Talbot imaging devices. Meanwhile, imaging by an X-ray Talbot imaging device as described in JP 4445397 B takes a relatively long time. Therefore, minimizing an influence of vibration and deformation of the object on a captured image is required in a case of imaging the object under a stress in which a tensile/compressive load is applied.

SUMMARY

An object of the present invention is to minimize the influence of vibration or deformation of an object on a captured image and improve image quality of the captured image in a case of imaging the object by an X-ray Talbot imaging device under a stress in which a tensile/compressive load is applied.

To achieve the abovementioned object, according to an aspect of the present invention, an X-ray imaging system reflecting one aspect of the present invention comprises: an X-ray Talbot imaging device that has an object table, an X-ray source, a plurality of gratings, and an X-ray detector provided side by side in a direction of an X-ray irradiation axis, and irradiates the X-ray detector with an X-ray from the X-ray source through an object and the plurality of gratings to acquire a moiré image necessary for generation of a reconstructed image of the object; and a tester that is installed on the object table, holds the object, and loads a tensile load or a compressive load on the object, wherein the X-ray Talbot imaging device includes a hardware processor that causes a series of imaging to be performed to acquire the moiré image necessary for generation of the reconstructed image of the object, the tester includes: a base part that is installed on the object table and has an X-ray transmitting part on the X-ray irradiation axis and an X-ray irradiation range around the X-ray irradiation axis; and a chuck that is provided to protrude from the base part and arranged to sandwich the X-ray transmitting part, and loads the tensile load or the compressive load on the object, and an operation of the chuck is automatically controllable by the hardware processor of the X-ray Talbot imaging device in conjunction with the X-ray Talbot imaging device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5A is a schematic plan view in a case where the tester is placed flat and FIG. 5B is a schematic plan view in a case where the tester is vertically placed;

DETAILED DESCRIPTION OF EMBODIMENTS

Hereinafter, one or more embodiments of the present invention will be described with reference to the drawings. However, the scope of the invention is not limited to the disclosed embodiments.

In the present embodiment, an X-ray imaging system that loads a tensile load or a compressive load on an object H by a tester 30 and images the object H by an X-ray Talbot imaging device 1 to image an image of the object H under a stress in which a tensile/compressive load is applied, the image being not able to be captured by normal X-ray imaging devices, will be described.

Note that examples of the object H include various items including articles to undergo various tests and inspections, such a human body, an animal, and a plant, and are not particularly limited. However the object H in the present embodiment targets the whole samples such as metal, resin, composite material, and woven fabric, and is generally applicable to anything desired to verify internal characteristics. Then, an internal mechanism in such an object H can be observed by imaging by the X-ray Talbot imaging device 1.

In the present embodiment, an X-ray Talbot imaging device 1 using a Talbot-Lau interferometer provided with a radiation source grating (also referred to as a multi-grating, a multi-slit, a G0 grating, or the like) 12 is adopted. Note that an X-ray Talbot imaging device using a Talbot interferometer provided with only a first grating (also referred as a G1 grating) 14 and a second grating (also referred as a G2 grating) 15 without including the radiation source grating 12 can also be adopted.

[X-Ray Talbot Imaging Device]

Figure 1:
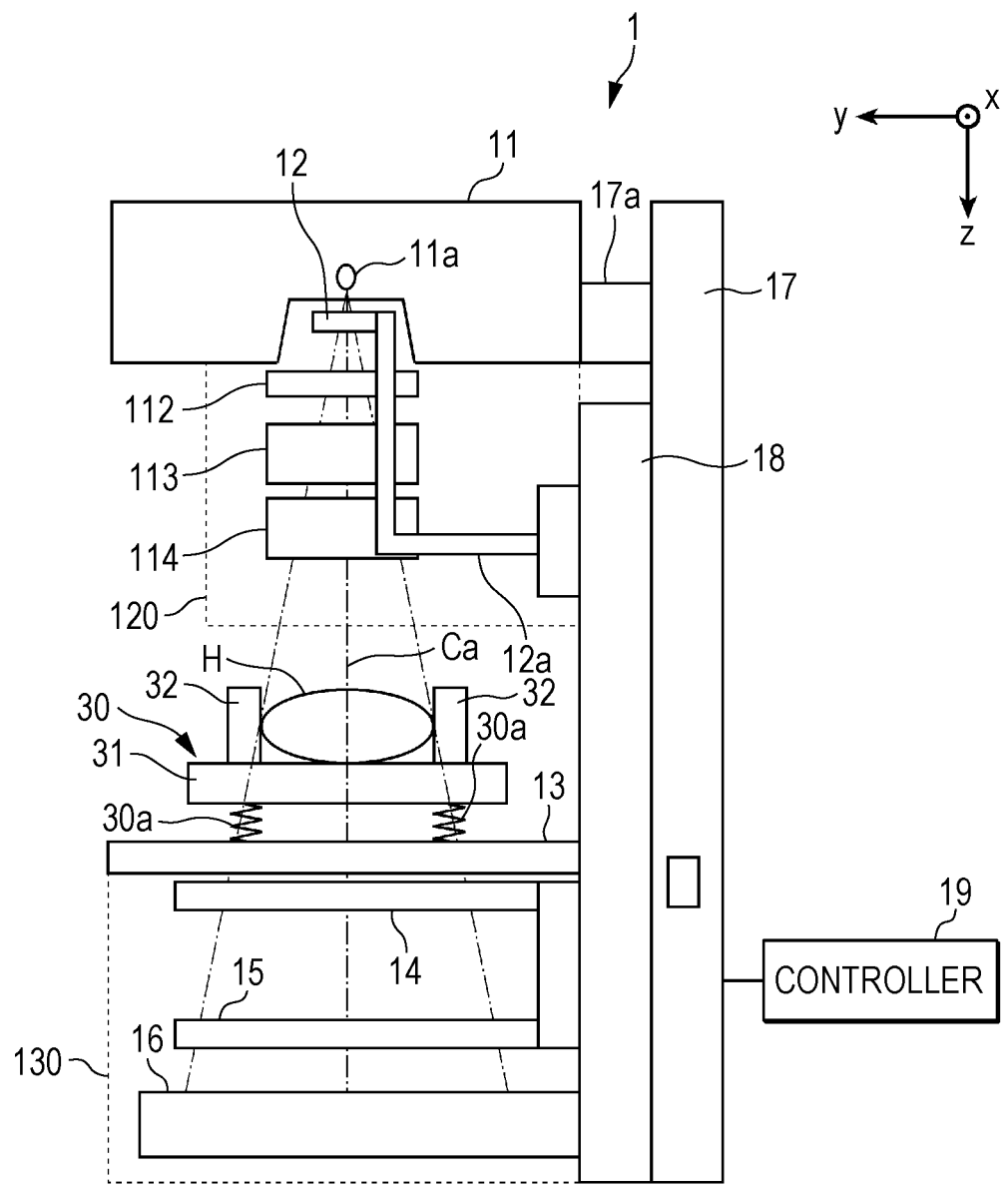
FIG. 1 is a schematic diagram illustrating an overall image of an X-ray Talbot imaging device and a tester having a vibration isolator.
Figure 2:
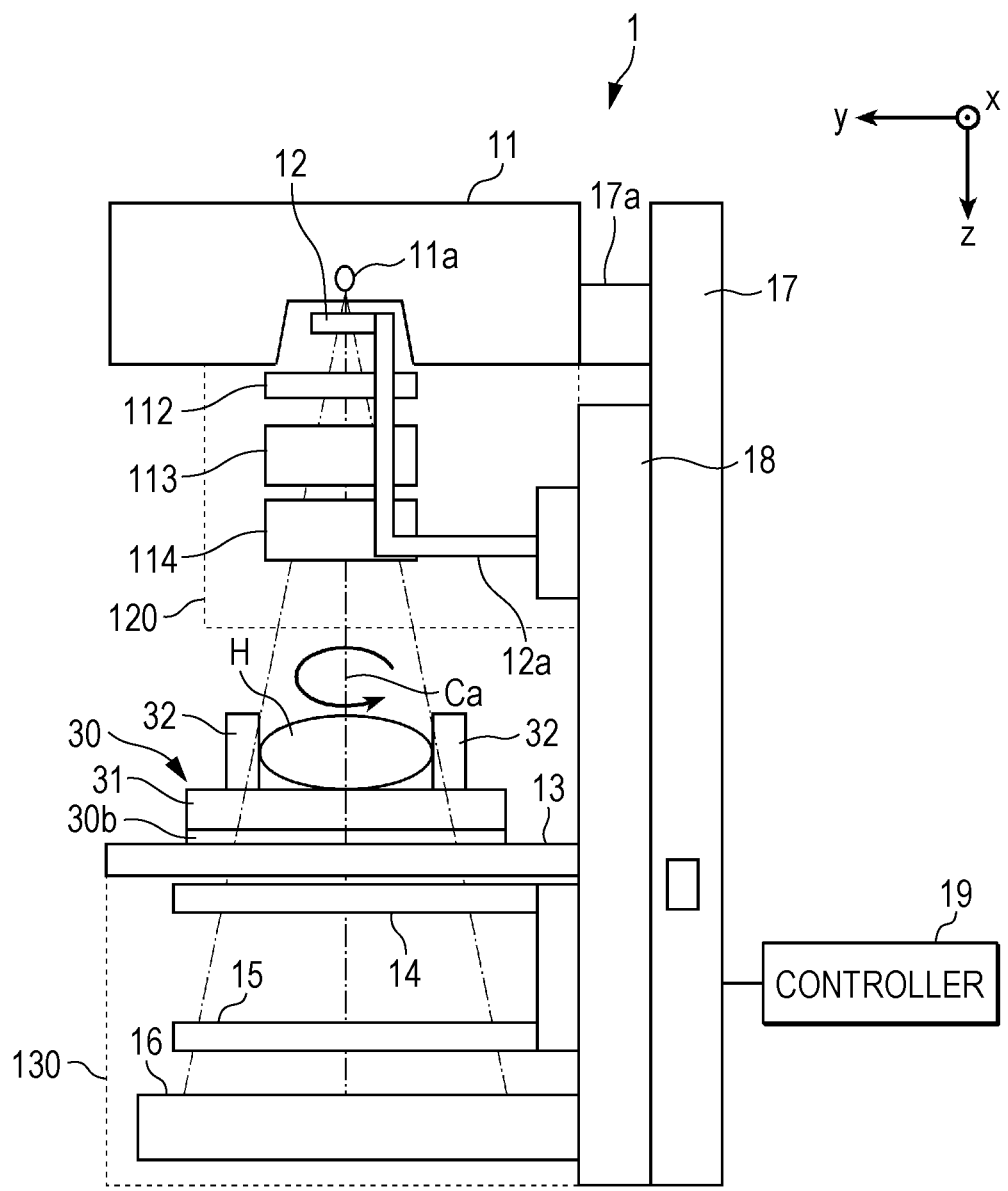
FIG. 2 is a schematic diagram illustrating an overall image of the X-ray Talbot imaging device and a tester having a rotator.

FIG. 1 is a schematic diagram illustrating an overall image of the X-ray Talbot imaging device 1 and the tester 30 having a vibration isolator 30a in the present embodiment. FIG. 2 is a schematic diagram illustrating an overall image of the X-ray Talbot imaging device 1 and the tester 30 having a rotator 30b.

The X-ray Talbot imaging device 1 according to the present embodiment includes an X-ray generation device 11, the radiation source grating 12, an object table 13, the first grating 14, the second grating 15, an X-ray detector 16, a support 17, and a base 18.

According to such an X-ray Talbot imaging device 1, an moiré image of the object H located at a predetermined position with respect to the object table 13 is captured by a method based on a principle of a fringe scanning method or the moiré image is analyzed using a Fourier transform method, whereby at least three types of images can be reconstructed (referred to as reconstructed images). That is, the three types of images include an absorption image (the same as a normal X-ray absorption image) obtained by imaging an average component of moiré fringes in the moiré image, a differential phase image obtained by imaging phase information of the moiré fringes, and a small angle scattering image obtained by imaging visibility of the moiré fringes. Note that more types of images can also be generated by reconstructing these three types of reconstructed images, or the like.

Note that the fringe scanning method is a method of performing reconstruction using images (noire images) obtained by moving one of a plurality of gratings in a slit period direction by 1/M of a slit period of the gratings at a time (M is a positive integer, and M>2 for the absorption image and M>3 for the differential phase image and the small angle scattering image) and imaging the grating M times, to obtain a high-resolution reconstructed image.

Further, the Fourier transform method is a method of imaging one moiré image by an X-ray Talbot imaging device in a state where an object exists and performing Fourier transform or the like for the moiré image in image processing to reconstruct and generate an image such as a differential phase image.

Here, first, a principle common to the Talbot interferometer and the Talbot-Lau interferometer will be described with reference to FIG. 3.

Figure 3:
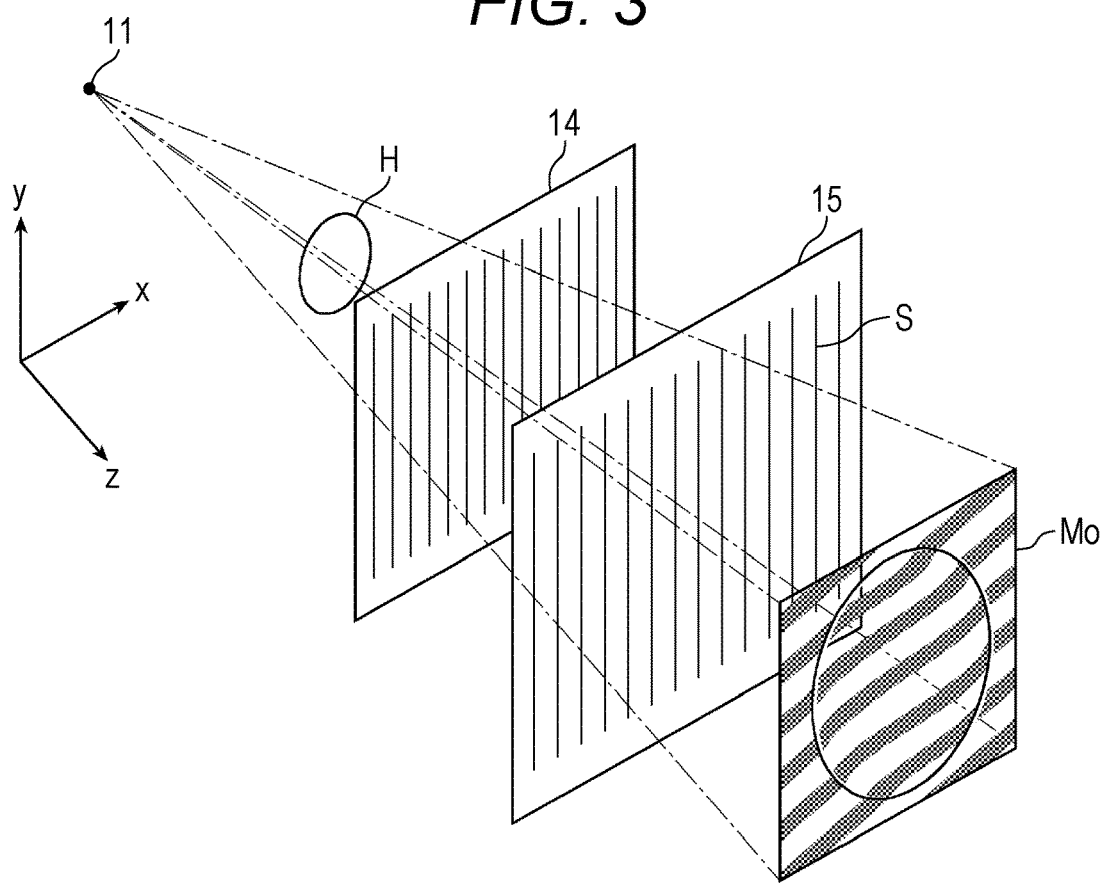
FIG. 3 is a diagram for describing a principle of a Talbot interferometer.

Note that FIG. 3 illustrates a case of the Talbot interferometer but basically similar description is made to a case of the Talbot-Lau interferometer. Further, a z direction in FIG. 3 corresponds to a vertical direction in the X-ray Talbot imaging device 1 in FIGS. 1 and 2, and x and y directions in FIG. 3 correspond to a horizontal direction (front-rear and right-left directions) in the X-ray Talbot imaging device 1 in FIGS. 1 and 2.

Figure 4:
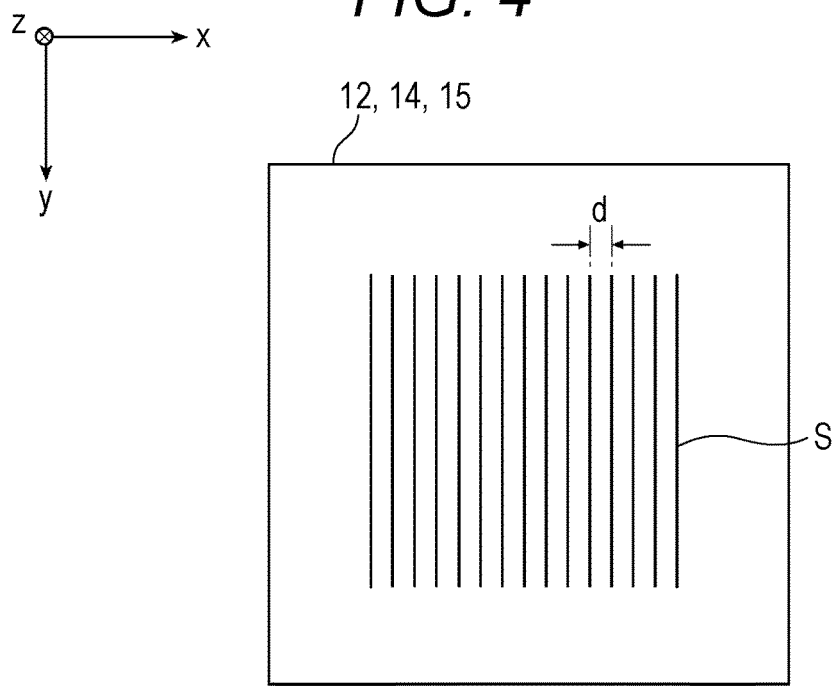
FIG. 4 is a schematic plan view of a radiation source grating, a first grating, or a second grating.

Further, as illustrated in FIG. 4, a plurality slits S is arrayed and formed in the first grating 14 and the second grating 15 (also in the radiation source grating 12 in the case of the Talbot-Lau interferometer) with a predetermined period d in the x direction orthogonal to the z direction that is an X-ray irradiation direction.

As illustrated in FIG. 3, when an X-ray radiated from an X-ray source 11a (an X-ray obtained by forming the X-ray radiated from the X-ray source 11a into multiple light sources by the radiation source grating 12 (not illustrated in FIG. 3) in the case of the Talbot-Lau interferometer) is transmitted through the first grating 14, the transmitted X-ray focuses into images at constant intervals in the z direction. Thus image is called self image (also referred to as a lattice image or the like), aid a phenomenon in which the self images are formed at constant intervals in the z direction is called Talbot effect.

That is, the Talbot effect refers to a phenomenon in which the self images are focused at constant intervals in a light traveling direction as described above when coherent light is transmitted through the first grating 14 provided with the slits S with a constant period d, as illustrated in FIG. 4.

Then, as illustrated in FIG. 3, the second grating 15 provided with the slits S similarly to the first grating 14 is arranged at a position where the self image of the first grating 14 is focused. At that time, the moiré image Mo can be obtained on the second grating 15 when the second grating 15 is arranged such that an extending direction (that is, the x-axis direction in FIG. 3) of the slit S in the second grating 15 becomes substantially parallel to an extending direction of the slit S in the first grating 14.

Note that, in FIG. 3, the moiré image Mo is separately illustrated from the second grating 15 because moiré fringes and the slits S coexist and difficult to distinguish if the moiré image Mo is illustrated on the second grating 15. However, in reality, the moiré image Mo is formed on the second grating 15 and on a downstream side of the second grating 15. Then, the moiré image Mo is captured by the X-ray detector 16 arranged directly under the second grating 15.

As illustrated in FIGS. 1 to 3, when the object H exists between the X-ray source 11a and the first grating 14, a phase of the X-ray is shifted by the object H, and therefore the moiré fringes of the moiré image Mo are disordered at a periphery of the object H. Although not illustrated, if the object H does not exist between the X-ray source 11a and the first grating 14, a moiré image Mo including only the moiré fringes appears. Tim above is the principle of the Talbot interferometer and the Talbot-Lau interferometer In the X-ray Talbot imaging device 1 according to the present embodiment, the second grating 15 is arranged at the position where the self image of the first grating 14 is focused within a second cover unit 130, as illustrated in FIGS. 1 and 2, for example, on the basis of the principle. Further, as described above, when the second grating 15 and the X-ray detector 16 are separated from each other, the moiré image Mo (see FIG. 3) becomes blurred. In the present embodiment, therefore, the X-ray detector 16 is arranged directly under the second grating 15. Further, the second grating 15 may be formed of light emitting material such as a scintillator or amorphous selenium, and the second grating 15 and the X-ray detector 16 may be integrated.

Note that the second cover unit 130 is provided for protecting the X-ray detector 16 and the like by preventing people and objects from hitting or touching the first grating 14, the second grating 15, the X-ray detector 16, and the like.

Although not illustrated, the X-ray detector 16 has a configuration in which conversion elements for generating electrical signals according to the radiated X-ray are arranged in a two-dimensional manner (in matrix manner), and the electrical signals generated by the conversion elements are read as image signals. Then, in the present embodiment, the X-ray detector 16 captures the moiré image Mo that is an image of the X-ray formed on the second grating 15, as the image signal of each conversion element. The pixel size of the X-ray detector 16 is 10 to 300 (μm), and is more favorably 50 to 200 (μm).

As the X-ray detector 16, a flat panel detector (FPD) can be used. Types of the FPD include an indirect conversion-type FPD that converts the detected X-ray into the electrical signal via a photoelectric conversion element, and a direct conversion-type FPD that directly converts the detected X-ray into the electrical signal. Either one of the types can be used.

In the indirect conversion-type FPD, the photoelectric conversion elements are two-dimensionally arranged together with thin film transistors (TFTs) under a scintillator plate of CsI, Gd2O2S, or the like, to constitute pixels. When the X-ray incident on the X-ray detector 16 is absorbed by the scintillator plate, the scintillator plate emits light. By this emitted light, charges are accumulated in each photoelectric conversion element, and the accumulated charge is read out as the image signal.

In the direct conversion-type FPD, an amorphous selenium film having a film thickness of 100 to 1000 (μm) is formed on glass by thermal evaporation of amorphous selenium, and the amorphous selenium film and electrodes are formed and deposited on an array of two-dimensionally arranged TFTs. When the amorphous selenium film absorbs the X-ray, a voltage is isolated in a substance in the form of electron-hole pair, and a voltage signal between the electrodes is read by the TFT.

Note that imaging means such as a charge coupled device (CCD) or an X-ray camera may be used as the X-ray detector 16.

In the present embodiment, the X-ray Talbot imaging device 1 captures a plurality of moiré images Mo using a so-called fringe scanning method. That is, the X-ray Talbot imaging device 1 according to the present embodiment captures a plurality of moiré images Mo while shifting relative positions of the first grating 14 and the second grating 15 in the x-axis direction (that is, the direction orthogonal to the extending direction (y-axis direction) of the slit S) in FIGS. 1 to 4.

Then, the absorption image, the differential phase image, the small angle scattering image, and the like are reconstructed on the basis of the plurality of moiré images Mo by image processing in an image processing device (not illustrated) that has received the image signals of the plurality of moiré images Mo from the X-ray Talbot imaging device 1.

Therefore, the X-ray Talbot imaging device 1 according to the present embodiment can move the first grating 14 by a predetermined amount at a time in the x-axis direction in order to image the plurality of moiré images Mo by the fringe scanning method. Note that the second grating 15 may be moved instead of the first grating 14 being moved, or both the first grating 14 and the second grating 15 may be moved.

It may also be configured such that the X-ray Talbot imaging device 1 reconstructs the absorption image, the differential phase image, and the like by capturing only one moiré image Mo while keeping the relative positions of the first grating 14 and the second grating 15 fixed, and analyzing the moiré image Mo using the Fourier transform method or the like by image processing in an image processing apparatus.

Configurations of other parts in the X-ray Talbot imaging device 1 according to the present embodiment will be described. In the present embodiment, the X-ray Talbot imaging device 1 is a so-called vertical X-ray Talbot imaging device, and the X-ray generation device 11, the radiation source grating 12, the object table 13, the first grating 14, the second grating 15, and the X-ray detector 16 are arranged in this order in the z direction that is a gravity direction. That is, in the present embodiment, the z direction is the X-ray irradiation direction from the X-ray generation device 11.

The X-ray generation device 11 includes, as the X-ray source 11a, a Coolidge X-ray source, a rotary anode X-ray source, or the like, which is widely used in the medical field, for example. Further, an X-ray source other than the above can be used. The X-ray generation device 11 of the present embodiment radiates the X-ray in a cone beam manner from a focal point. That is, as illustrated in FIGS. 1 and 2, the X ray is radiated to expand as the X-ray is away from the X-ray generation device 11, having an X-ray irradiation axis Ca coinciding with the z direction as a central axis (that is, an X-ray irradiation range).

Then, in the present embodiment, the radiation source grating 12 is provided below the X-ray generation device 11. In this case, in the present embodiment, to prevent vibration of the X-ray generation device 11 caused by rotation of an anode of the X-ray source 11a or the like from being transmitted to the radiation source grating 12, the radiation source grating 12 is not attached to the X-ray generation device 11 and is attached to a fixing member 12a attached to the base 18 provided on the support 17.

Note that, in the present embodiment, to prevent the vibration of the X-ray generation device 11 from propagating to the other parts of the X-ray Talbot imaging device 1 such as the support 17 (or to make the propagating vibration smaller), a cushioning member 17a is provided between the X-ray generation device 11 and the support 17.

In the present embodiment, a filtration filter (also referred to as an additional filter) 112 for changing the quality of the X-ray transmitted through the source grating 12, an irradiation field stop 113 for narrowing an irradiation field of the radiated X-ray, and an irradiation field lamp 114 for irradiating the object with visible light instead of the X-ray before irradiation with the X-ray to perform positioning, and the like are attached to the fixing member 12a, in addition to the radiation source grating 12.

Note that the radiation source grating 12, the filtration filter 112, and the irradiation field stop 113 are not necessarily provided in this order. Further, in the present embodiment, a first cover unit 120 for protecting the radiation source grating 12, and the like is arranged around the radiation source grating 12 and the like.

Further, a controller 19 (see FIGS. 1 and 2) is configured by a computer in which a central processing unit (CPU), a read only memory (ROM), a random access memory (RAM), an input/output interface, and the like are connected to a bus in the present embodiment. Note that the controller 19 can be configured as a special control device instead of a general-purpose computer as in the present embodiment. Further, although not illustrated, the controller 19 is provided with appropriate means and devices such as input means and output means including an operation part, storage means, and communication means.

The output means includes a display (illustration is omitted) for displaying information necessary for performing various operations of the X-ray Talbot imaging device 1 and a generated reconstructed image.

The controller 19 performs overall control of the X-ray Talbot imaging device 1. That is, for example, the controller 19 is connected to the X-ray generation device 11, and can set a tube voltage, a tube current, an irradiation time, and the like to the X-ray source 11a. Further, for example, the controller 19 may be configured to relay transmission/reception of signals and data between the X-ray detector 16 and an external image processing apparatus (not illustrated) or the like.

That is, the controller 19 in the present embodiment functions as a control part that causes a series of imaging to be performed for acquiring a plurality of moiré images Mo (one moiré image in the case of the Fourier transform method) necessary for generation of a reconstructed image of the object H.

[Tester]

As illustrated in FIGS. 1 and 2, the tester 30 is provided on the object table 13, has the object H provided thereon, and loads a tensile load or a compressive load on the object H.

Figure 5A:
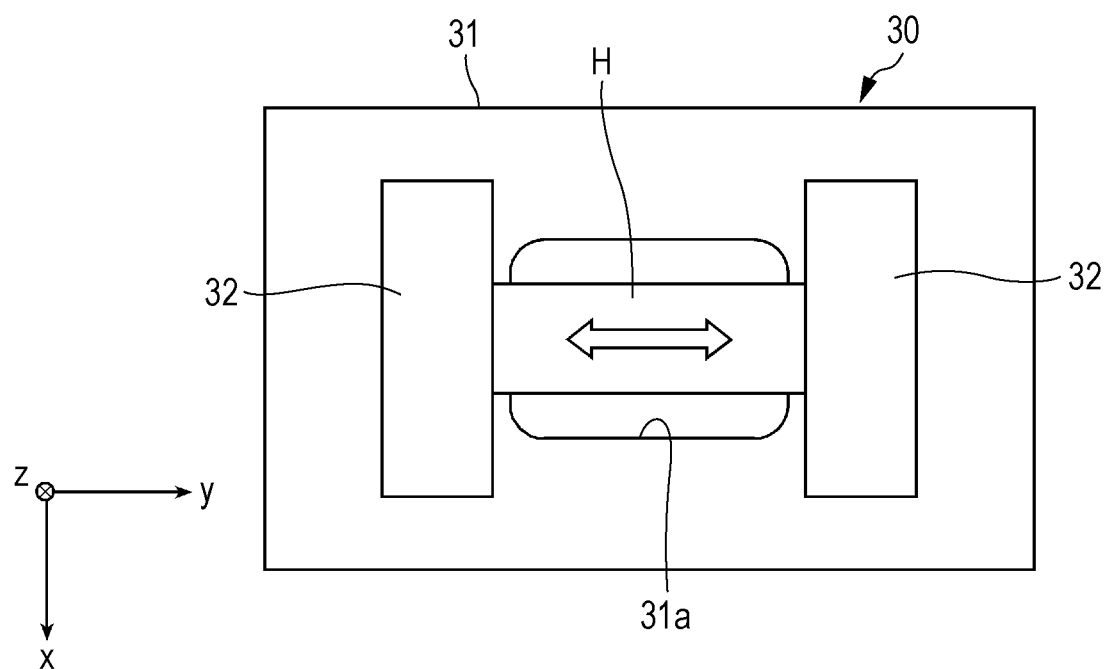
FIGS. 5A and 5B illustrate an overall image of the tester.
Figure 5B:
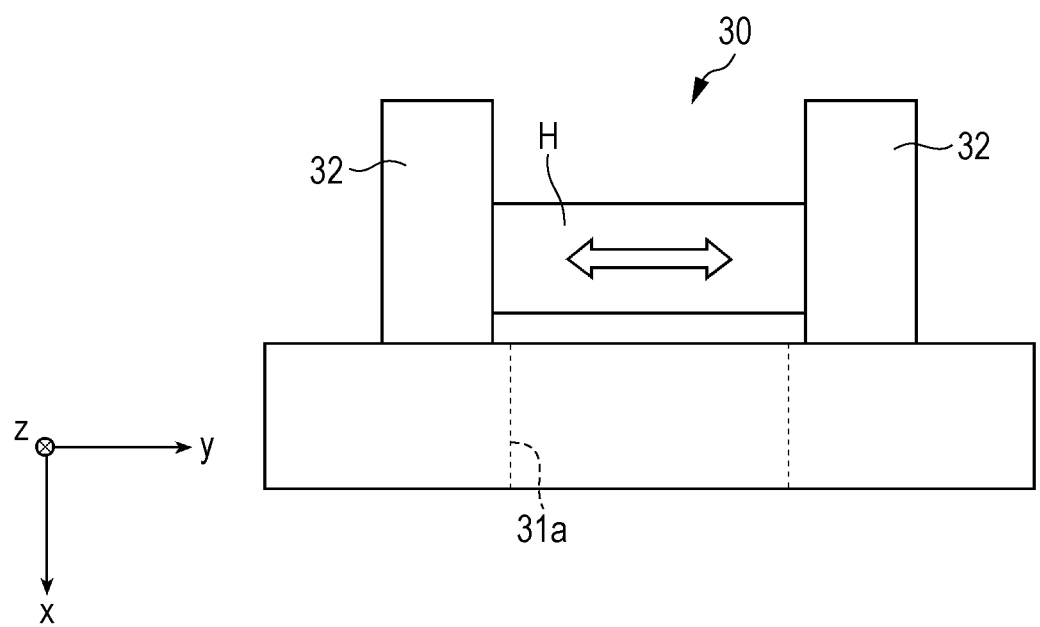

Such a tester 30 includes a base part 31 and a chuck 32, as illustrated in FIGS. 5A and 5B.

The base part 31 is installed on the object table 13. In this case, the base part 31 may be fixed on the object table 13 or may be in a non-fixed state.

The base part 31 has an X-ray transmitting part 31a that is less likely to hinder transmission of the X-ray than surroundings on the X-ray irradiation axis Ca and in the X-ray irradiation range around the X-ray irradiation axis Ca. The X-ray transmitting part 31a in the present embodiment is an opening formed in the base part 31. In other words, the X-ray transmitting part 31a is a through-hole penetrating the base part 31 in a thickness direction, and does not hinder the transmission of the X-ray.

Such an X-ray transmitting part 31a is formed into a size that can cover an imaging portion in the object H.

Note that, in the present embodiment, the X-ray transmitting part 31a is an opening (through-hole). However, the X-ray transmitting part 31a is not limited thereto, and may be configured by material having high X-ray transmittance (for example, a resin, or a resin mixed with carbon fiber or glass fiber).

Further, a portion excluding the X-ray transmitting part 31a of the base part 31 in the present embodiment is mainly configured by metal. However the portion may be configured by material having high X-ray transmittance.

The chuck 32 loads the tensile load or the compressive load on the object H. and is configured to be able to hold the object H. More specifically, a plurality of the chucks 32 (a pair of the chucks 32 in the present embodiment) is provided on the base part 31, and can fix both ends of the object H directly or indirectly using special fixtures (illustration is omitted).

Further, as illustrated in FIGS. 5A and 5B, the pair of chucks 32 is provided to protrude from the base part 31 and is arranged to sandwich the X-ray transmitting part 31a.

The pair of chucks 32 operates in a separating direction when the tensile load is loaded on the object H. and the pair of chucks 32 operates in an approaching direction when the compressive load is loaded on the object H. In the case of loading the tensile load or the compressive load on the object H, the pair of chucks 32 operates in conjunction with each other in the present embodiment. However the operation is not limited thereto, and one of the chucks 32 may be in a fixed state and only the other chuck 32 may operate.

Further, the base part 31 includes constituent elements necessary for operating the chucks 32, such as a guide rail and a driver (not illustrated).

Then, such an operation of the chucks 32 is automatically controllable by the controller 19 (control part) of the X-ray Talbot imaging device 1 in conjunction with the X-ray Talbot imaging device 1.

That is, the series of imaging for acquiring the plurality of moiré images Mo by the X-ray Talbot imaging device 1 is controlled by the controller 19. At the series of imaging, the operation of the chucks 32 that load the tensile load or the compressive load on the object H is also performed by the controller 19. That is, the controller 19 and the driver for operating the chucks 32 are in a communicatively connected state.

The tester 30 is basically used causing a surface having a large area of the base part 31 and not provided with the chucks 32 to face the object table 13, as illustrated in FIG. 5A. That is, the tester 30 is placed flat and used.

In a case of changing the direction of imaging of the object H while holding the object H with the chucks 32, the tester 30 can be used in a state where the base part 31 is vertically placed from the flat state, as illustrated in FIG. 5B. That is, the tester 30 can be vertically placed and used.

By appropriately changing the direction of the tester 30 in this way, the object H can be captured from different sides while holding the object H with the chucks 32. That is, the direction of the object H can be changed in a state where the operation to load the tensile load or the compressive load is maintained by the chucks 32.

[First Configuration Example of Tester]

The X-ray Talbot imaging device 1 and the tester 30 are mechanically independently provided although the controller 19 and the driver for operating the chucks 32 are in a communicatively connected state, as described above. Therefore, not only suppression of the vibration caused in the X-ray Talbot imaging device 1 by using the cushioning member 17a as described above and providing a cushioning member (illustration is omitted) between the X-ray Talbot imaging device 1 and an installation floor surface, for example, but also suppression of vibration transmitted to (or generated from) the tester 30 is required.

Therefore, at least one of the object table 13 of the X-ray Talbot imaging device 1 and the tester 30 has the vibration isolator 30a for preventing transmission of vibration to the object H.

As the vibration isolator 30a in the present embodiment, a spring vibration isolator is used. However, the vibration isolator 30a is not limited thereto and a rubber vibration isolator may be used.

The vibration isolator 30a is located between the object table 13 and the base part 31 of the tester 30, as illustrated in FIG. 1, and having a lower end attached to the object table 13 and an upper end attached to the base part 31.

Note that, in the present embodiment, the tester 30 has the vibration isolator 30a. However, the object table 13 of the X-ray Talbot imaging device 1 may have the vibration isolator 30a.

[Second Configuration Example of Tester]

The plurality of gratings 12, 14, and 15 is one-dimensional gratings. Therefore, the moiré image Mo acquired by the X-ray Talbot imaging device 1 has a direction. That is, there are cases where a visible part and an invisible part occur depending on the imaging direction of the object H.

Therefore, as illustrated in FIG. 2, either the object table 13 of the X-ray Talbot imaging device 1 or the tester 30 has the rotator 30b for rotating the object H around the X-ray irradiation axis Ca. In a case of rotating the tester 30 in the state of holding the object H at an arbitrary angle by the rotator 30b, an image of the object H captured before the rotation and an image of the object H captured after the rotation look different, and a predetermined portion of the object H, which hasn't been seen before the rotation, can be viewed in the image captured after the rotation.

As the rotator 30b in the present embodiment, a circular or frame-like rotation member having an opening (not illustrated) formed in the center with a rotation center corresponding to the X-ray irradiation axis Ca is used, for example. Further, the opening formed in the center corresponds to the X-ray transmitting part 31a (opening) of the base part 31 and can easily transmit the X-ray.

Further, the material forming the rotator 30b may be configured by material having high X-ray transmittance, similarly to the X-ray transmitting part 31a. In this case, the opening may not be formed in the center.

The rotator 30b is located between the object table 13 and the base part 31 of the tester 30, and having a lower end surface attached to the object table 13 and an upper end surface attached to the base part 31. Further, the rotator 30b includes a rotating body (not illustrated) rotatably configured and to which the base part 31 of the tester 30 is attached on the upper end surface side, and a driver for rotating the rotating body on the lower end surface side.

Note that, in the present embodiment, the tester 30 has the rotator 30b. However, the object table 13 of the X-ray Talbot imaging device 1 may have the rotator 30b.

Further, the rotation operation of the rotator 30b is automatically controllable by the controller 19 (control part) of the X-ray Talbot imaging device 1 in conjunction with the X-ray Talbot imaging device 1. That is, the controller 19 and the driver for operating the rotating body are in a communicatively connected state.

[Third Configuration Example of Tester]

The tester 30 is not always used in every imaging, and can obtain highly accurate information regarding the object H by performing imaging while loading the tensile load or the compressive load and normal X-ray Talbot imaging together.

Figure 6A:
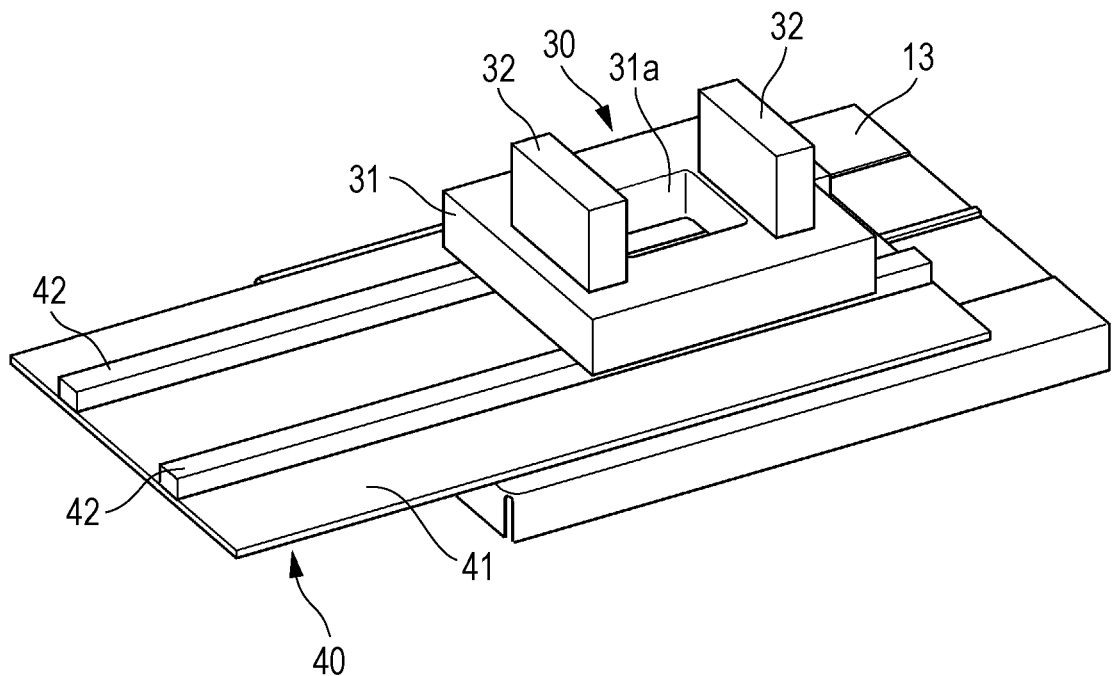
FIGS. 6A and 6B are schematic views illustrating a configuration of a mover for moving the tester.
Figure 6B:
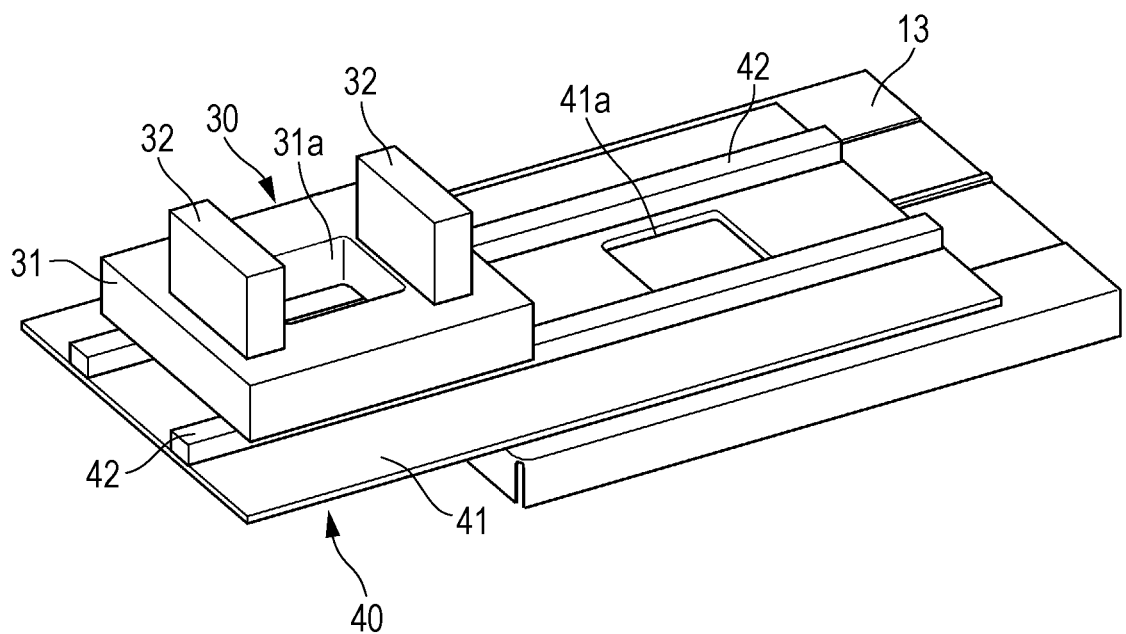

Therefore, the tester 30 is provided on the object table 13 of the X-ray Talbot imaging device 1 in an advanceable and retractable manner with respect to the X-ray irradiation range, as illustrated in FIGS. 6A and 6B. In other words, the tester 30 is provided on the object table 13 of the X-ray Talbot imaging device 1 to become advanceable and retractable with respect to the X-ray irradiation range.

The object table 13 is provided with a mover 40 for moving the tester 30 to be away from or approach the X-ray irradiation range The mover 40 includes an installation table 41 attached to the object table 13 and a guide rail 42 long along a length direction of the installation table 41.

The installation table 41 is formed in a rectangular plate shape and is set to have a length protruding outward from an upper surface of the object table 13. Further, an opening 41a corresponding to the X-ray irradiation range is formed in a portion of the installation table 41, the portion being placed on the upper surface of the object table 13, and is less likely to hinder the transmission of the X-ray.

A pair of guide rails 42 is provided on the installation table 41 and is set long along the length direction of the installation table 41. Further, the guide rails 42 include a moving body (not illustrated) movable along the guide rails and a driver (not illustrated) for moving the moving body.

The tester 30 is attached to the moving body of the guide rails 42, and can move (advance/retract) from a position corresponding to the X-ray irradiation range of the object table 13 to an outside of the object table 13.

In a case of performing the imaging using the tester 30, the imaging is performed in the state illustrated in FIG. 6A. In a case of performing the normal X-ray Talbot imaging, the imaging is performed in the state illustrated in FIG. 6B.

Note that the operation of the moving body in the mover 40 is automatically controllable by the controller 19 (control part) of the X-ray Talbot imaging device 1 in conjunction with the X-ray Talbot imaging device 1. That is, the controller 19 and the driver for operating the moving body are in a communicatively connected state.

The vibration isolator 30a, the rotator 30b, and the mover 40 described in the first to third configuration examples of the tester 30 may be separately used or may be used in an appropriate combination. In the case of using the vibration isolator 30a, the rotator 30b, and the mover 40 in an appropriate combination, the vibration isolator 30a, the rotator 30b, and the mover 40 reliably function, and the tensile load or the compressive load is loaded to the object H by the tester 30.

[Control at Imaging by X-Ray Talbot Imaging Device]

The operation of the chucks 32 in the tester 30 is automatically controllable by the controller 19 of the X-ray Talbot imaging device 1 in conjunction with the X-ray Talbot imaging device 1. Therefore, the imaging by the X-ray Talbot imaging device 1 can be performed while the tensile load or the compressive load is loaded on the object H by the tester 30.

(1) Control of Operation Stop

The control part of the X-ray Talbot imaging device 1 can perform control to stop the operation to load the tensile load or the compressive load on the object H by the chucks 32 at imaging.

In an elastic deformation zone, the load and a deformation amount loaded on the object H become constant when the operation of the chucks 32 is stopped, similarly to a spring, for example.

By the above control, deterioration of the image quality of the captured image due to the unintended deformation of the object H can be prevented in an inspection in which a constant load/a constant deformation amount is applied to the object H and change is observed in the elastic deformation zone of the object H.

(2) Control of Operation Continuation

The control part of the X-ray Talbot imaging device 1 can perform control to continue the operation to load the tensile load or the compressive load on the object H by the chucks 32 at imaging.

In a plastic deformation zone, the object H is deformed (stretched/compressed) even when the operation of the chucks 32 is stopped. Therefore, a constant load cannot be provided and thus a tensile operation needs to be appropriately changed according to the deformation of the object H.

By the above control, deterioration of the image quality of the captured image due to the unintended deformation of the object H can be prevented in an inspection in which a constant load/a constant deformation amount is applied to the object H and change is observed in the plastic deformation zone of the object H.

(3) Maximum Allowable Speed

If the object H is deformed by an arbitrary number of pixels (for example, two pixels) or more in a case of performing imaging while continuing the operation to load the tensile load or the compressive load on the object H by the chucks 32, blurring may be caused in the generated reconstructed image. Further, since the imaging by the X-ray Talbot imaging device 1 relatively takes time, minimizing an influence of deformation of the object H on the captured image is required in consideration of an imaging time in the case of loading the tensile load or the compressive load on the object H.

Therefore, in the present embodiment, the control part controls the load to be loaded at a speed not to cause the deformation of two pixels or more during the imaging time in the case of deforming the object H by the chucks 32.

More specifically, the control part calculates a maximum allowable speed of when the tensile load or the compressive load on the object H by the chucks 32 is loaded, according to a predetermined calculation formula based on a pixel pitch in a plurality of pixels in the X-ray detector 16, a magnification ratio of an image detected by each pixel, and the imaging time.

The calculation formula: the maximum allowable speed=2×the pixel pitch×the magnification ratio/the imaging time×a tolerance factor (<1)

Here, the pixel pitch is synonymous with the above-mentioned pixel size, and the pixel size is said to be 10 to 300 (μm), and more favorably 50 to 200 (μm). In the present embodiment, the pixel pitch is set to 100 μm, for example.

The magnification ratio of an image is as illustrated in FIG. 3, and the X-ray generation device 11 radiates the X-ray in a cone beam manner from the focal point. Therefore, when the X-ray detector 16 detects the X-ray, the moiré image Mo enlarged than the actual size of the object H is obtained. How much the image is enlarged can be derived from the distance from the object H to the X-ray detector 16, and the magnification ratio is used for the predetermined calculation formula. In the present embodiment, the magnification ratio is 1.5 times, for example.

The imaging time is appropriately set for each object H or according to the type or material of the object H, or the like. In the present embodiment, the imaging time is set to 10 seconds, for example.

The tolerance factor is a safety factor arbitrarily set depending on the use, and is 1 or less in the present embodiment, for example.

Therefore, the maximum allowable speed in the present embodiment is 30 μm/second.

Then, the control part displays the calculated maximum allowable speed (calculation result) on a display of the controller 19 cooperating with the X-ray Talbot imaging device 1.

A user such as a radiological technician or an inspector can confirm the maximum allowable speed displayed on the display and can perform an imaging operation by the X-ray Talbot imaging device 1 while operating the speed of when the tensile load or the compressive load is loaded becomes the maximum allowable speed or less, whereby blurring is less likely to occur in the generated reconstructed image, and a clear image can be acquired.

(4) Setting of Imaging Start Time

Figure 7:
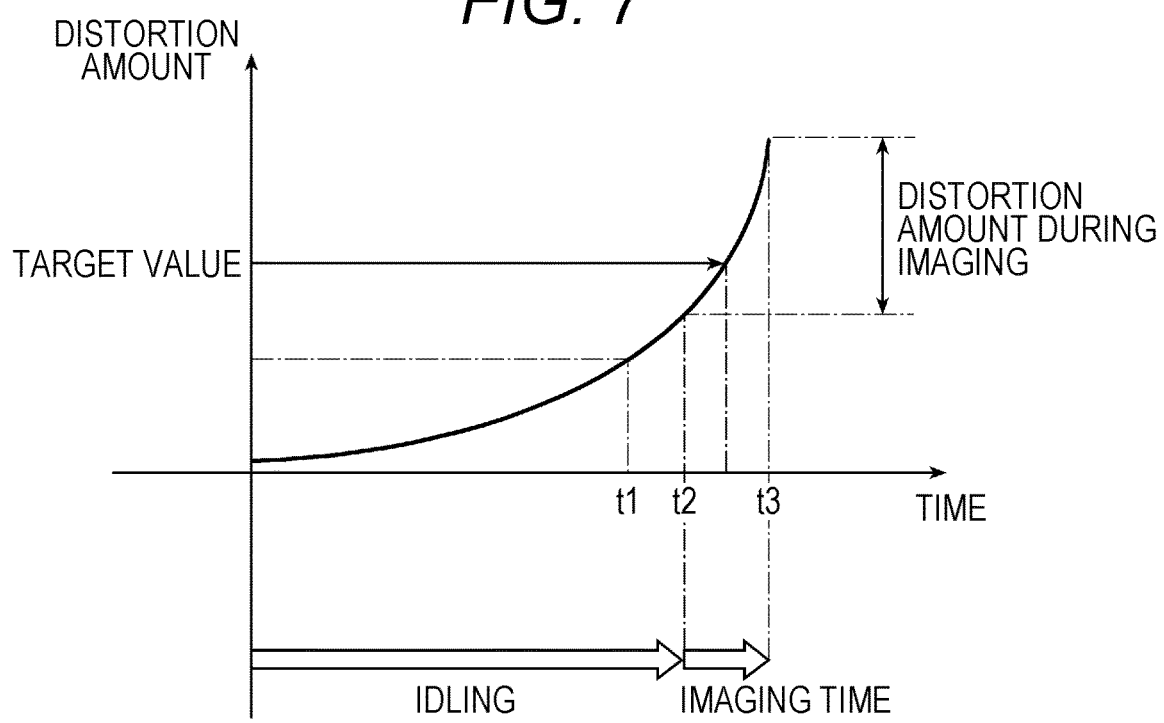
FIG. 7 is a graph for describing a predicted time to reach a peak load.

When the tensile load or the compressive load is continuously loaded on the object H, a distortion amount becomes gradually large in the plastic deformation zone of the object H, as illustrated in FIG. 7 (see the curve illustrated in FIG. 7). Therefore, the control part of the X-ray Talbot imaging device 1 estimates the distortion amount of the object H during imaging from the transition of the distortion amount of the object H before start of imaging, when performing imaging at a moment when the load reaches a target tensile load or a target compressive load, and sets an imaging start time when the distortion amount of the object H becomes minimum on the basis of the estimated distortion amount of the object H.

More specifically, first, the material for estimating the distortion amount can be obtained from a distortion amount of a sample (similar to the object H) loaded with a load by the chucks 32 or linear approximation, in advance.

Then, in a case of actually imaging the object H, the control part predicts a curve ahead from the transition of the distortion amount at time t1. That is, the controller derives a predicted time to reach a peak load. The controller sets t2 including a target value of the distortion amount and having a minimum distortion amount during t2 to t3 as the imaging start time. As a result, the distortion amount within the imaging time is immunized, whereby the influence on the image can be minimized.

Note that FIG. 7 illustrates a graph of a case of loading the tensile load on the object H. In a case of loading the compressive load, a curve appears in an opposite fashion to FIG. 7.

(5) Image Acquisition Timing

As described above, since the imaging by the X-ray Talbot imaging device 1 relatively takes time, the load gradually becomes small due to the deformation of the object H in a case where the object H is irreversibly deformed beyond the elastic deformation zone (for example, the object H continuously stretches when loaded with a stretching load).

Therefore, the control part of the X-ray Talbot imaging device 1 divides the imaging by the fringe scanning into three or more stages when acquiring the plurality of moiré images Mo by the fringe scanning, and performs control to load the tensile load or the compressive load on the object H by the chucks 32 in accordance with a period of the fringe scanning.

Figure 8:
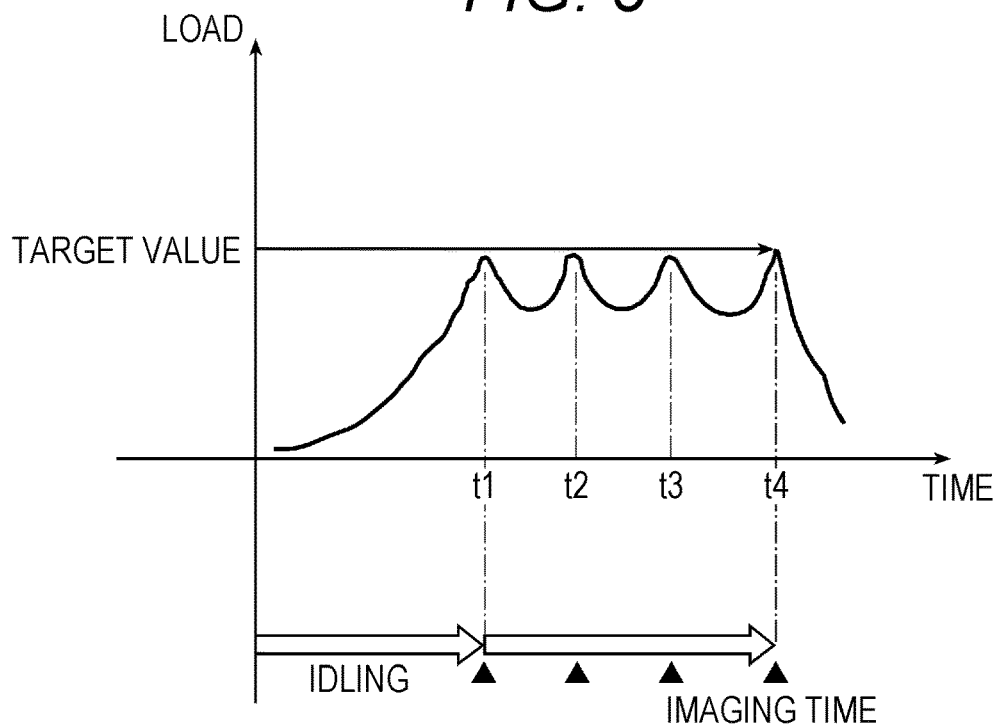
FIG. 8 is a graph for describing image acquisition timing.

In the present embodiment, as illustrated in FIG. 8, the number of times of X-ray exposure is a total of four times (represented by "▲" in FIG. 8). The control part controls the operation of the chucks 32 in accordance with the timing of the X-ray exposure.

In other words, the control part controls the operation of the chucks 32 such that a target load is applied to the object H at times t1 to t4 that coincide with the timing of the total of four times of the X-ray exposure, of the imaging time.

By performing the above control, the load is loaded only at timing when the image is actually acquired within the imaging time, elongation of the object H in the entire imaging can be minimized and the influence on the captured image can be minimized.

As described above, according to the present embodiment, an internal state of the object H in the state where the tensile load is applied can be confirmed. Therefore, variation in a substance when a load is applied can be checked. Further, by especially observing an on-going status where the load is gradually applied, a variation mechanism of a substance constituting the object H can be checked. Then, by simultaneously capturing such a status with a differential phase image or a small angle scattering image peculiar to a Talbot image, or an ordinary absorption image, an internal mechanism of the object H, which cannot be seen by a conventional tensile test or compression test, can be clarified.

Therefore, in a case of imaging the object H by the X-ray Talbot imaging device 1 under a stress in which a tensile/compressive load is applied, the influence of vibration or deformation of the object H on the captured image can be minimized and the image quality of the captured image can be improved.

Further, the X-ray Talbot imaging device 1 and the tester 30 are mechanically independently provided, and at least one of the object table 13 of the X-ray Talbot imaging device 1 and the tester 30 includes the vibration isolator 30*a* for preventing transmission of the vibration to the object H. Therefore, transmission of the vibration caused in the X-ray Talbot imaging device 1 to the object H can be prevented, and the image quality of the captured image can be improved.

Further, since the tester 30 is provided on the object table 13 of the X-ray Talbot imaging device 1 in an advanceable/retractable manner with respect to the X-ray irradiation range, imaging by the X-ray Talbot imaging device 1 using the tester 30 and imaging by the normal X-ray Talbot imaging device 1 without using the tester 30 can be appropriately switched.

Further, the plurality of gratings 12, 14, and 15 is one-dimensional gratings, and either the object table 13 of the X-ray Talbot imaging device 1 or the tester 30 has the rotator 30*b* that rotates the object H around the X-ray irradiation axis Ca. Therefore, the image of the object H captured before the rotation and the image of the object H after the rotation look different, and a portion (a scratch or a defect, for example) of the object H, which hasn't been seen before the rotation, can be seen in the image captured after the rotation, and the object H can be inspected in detail.

Further, the control part of the X-ray Talbot imaging device 1 performs control to stop the operation to load the tensile load or the compressive load on the object H by the chucks 32 at imaging. Therefore, deterioration of the image quality of the captured image due to unintended deformation of the object H can be prevented in the elastic deformation zone of the object H.

Further, the control part of the X-ray Talbot imaging device 1 performs control to continue the operation to load the tensile load or the compressive load on the object H by the chucks 32 at imaging. Therefore, deterioration of the image quality of the captured image due to unintended deformation of the object H can be prevented in the plastic deformation zone of the object H.

Further, the control part of the X-ray Talbot imaging device 1 calculates the maximum allowable speed of when the tensile load or the compressive load on the object H by the chucks 32 is loaded according to the predetermined calculation formula based on the pitch of the plurality of pixels in the X-ray detector 16, the magnification ratio of the image detected by each of the pixels, and the imaging time, and displays the calculation result on the display cooperating with the X-ray Talbot imaging device 1, whereby the user can confirm the maximum allowable speed displayed on the display and can perform an imaging operation by the X-ray Talbot imaging device 1 while operating the speed of when the tensile load or the compressive load is loaded becomes the maximum allowable speed or less. As a result, blurring is less likely to occur in the generated reconstructed image, and a clear image can be acquired.

Further, the control part of the X-ray Talbot imaging device 1 estimates the distortion amount of the object H during imaging from the transition of the distortion amount of the object H before start of imaging when performing imaging at a moment when the load reaches the target tensile load or the target compressive load, and sets the imaging start time when the distortion amount of the object H becomes minimum on the basis of the estimated distortion amount of the object H, whereby the distortion amount within the imaging time can be minimized and the influence on the image can be minimized.

Further, the control part of the X-ray Talbot imaging device 1 divides the imaging by the fringe scanning into three or more stages and performs the imaging when acquiring the plurality of moiré images Mo by the fringe scanning, and loads the tensile load or the compressive load on the object H by the chucks 32 in accordance with the period of the fringe scanning, whereby the load is loaded only at timing when the image is actually acquired within the imaging time, and elongation of the object H in the entire imaging can be minimized and the influence on the captured image can be minimized.

Although embodiments of the present invention have been described and illustrated in detail, the disclosed embodiments are made for purposes of illustration and example only and not limitation. The scope of the present invention should be interpreted by terms of the appended claims.

What is claimed is:

1. An X-ray imaging system comprising:
  an X-ray Talbot imaging device that has an object table, an X-ray source, a plurality of gratings, and an X-ray detector provided side by side in a direction of an X-ray irradiation axis, and irradiates the X-ray detector with an X-ray from the X-ray source through an object and the plurality of gratings to acquire a moiré image necessary for generation of a reconstructed image of the object; and
  a tester that is installed on the object table, holds the object, and loads a tensile load or a compressive load on the object, wherein
  the X-ray Talbot imaging device includes
    a hardware processor that causes a series of imaging to be performed to acquire the moiré image necessary for generation of the reconstructed image of the object,
  the tester includes:
    a base part that is installed on the object table and has an X-ray transmitting part on the X-ray irradiation axis and an X-ray irradiation range around the X-ray irradiation axis; and
    a chuck that is provided to protrude from the base part and arranged to sandwich the X-ray transmitting part, and loads the tensile load or the compressive load on the object,
  an operation of the chuck is automatically controllable by the hardware processor of the X-ray Talbot imaging device in conjunction with the X-ray Talbot imaging device,
  the X-ray Talbot imaging device and the tester are mechanically independently provided,
  at least one of the object table of the X-ray Talbot imaging device and the tester has a vibration isolator for preventing transmission of vibration to the object,
  the hardware processor of the X-ray Talbot imaging device performs control to continue the operation to load the tensile load or the compressive load on the object by the chuck at imaging, and
  the hardware processor of the X-ray Talbot imaging device calculates a maximum allowable speed of when the tensile load or the compressive load is loaded on the object by the chuck according to a predetermined calculation formula based on a pitch of a plurality of pixels in the X-ray detector, a magnification ratio of an image detected by each of the pixels, and an imaging time, and displays a calculation result on a display cooperating with the X-ray Talbot imaging device.

2. The X-ray imaging system according to claim 1, wherein the tester is provided on the object table of the X-ray Talbot imaging device in an advanceable and retractable manner with respect to the X-ray irradiation range.

3. The X-ray imaging system according to claim 1, wherein
the plurality of gratings is one-dimensional gratings, and
either the object table of the X-ray Talbot imaging device or the tester has a rotator that rotates the object around the X-ray irradiation axis.

4. The X-ray imaging system according to claim 1, wherein the hardware processor of the X-ray Talbot imaging device performs control to stop the operation to load the tensile load or the compressive load on the object by the chuck at imaging.

5. The X-ray imaging system according to claim 1, wherein the object table of the X-ray Talbot imaging device has the vibration isolator for preventing transmission of vibration to the object.

6. The X-ray imaging system according to claim 1, wherein the tester has the vibration isolator for preventing transmission of vibration to the object.

7. The X-ray imaging system according to claim 1, wherein the vibration isolator is located between the object table of the X-ray Talbot imaging device and the base part of the tester.

8. The X-ray imaging system according to claim 1, wherein the vibration isolator is a spring vibration isolator.

9. The X-ray imaging system according to claim 1, wherein the vibration isolator is a rubber vibration isolator.

10. An X ray imaging system comprising:
an X-ray Talbot imaging device that has an object table, an X-ray source, a plurality of gratings, and an X-ray detector provided side by side in a direction of an X-ray irradiation axis, and irradiates the X-ray detector with an X-ray from the X-ray source through an object and the plurality of gratings to acquire a moiré image necessary for generation of a reconstructed image of the object; and
a tester that is installed on the object table, holds the object, and loads a tensile load or a compressive load on the object, wherein
the X-ray Talbot imaging device includes
a hardware processor that causes a series of imaging to be performed to acquire the moiré image necessary for generation of the reconstructed image of the object,
the tester includes:
a base part that is installed on the object table and has an X-ray transmitting part on the X-ray irradiation axis and an X-ray irradiation range around the X-ray irradiation axis; and
a chuck that is provided to protrude from the base part and arranged to sandwich the X-ray transmitting part, and loads the tensile load or the compressive load on the object,
an operation of the chuck is automatically controllable by the hardware processor of the X-ray Talbot imaging device in conjunction with the X-ray Talbot imaging device,
the X-ray Talbot imaging device and the tester are mechanically independently provided,
at least one of the object table of the X-ray Talbot imaging device and the tester has a vibration isolator for preventing transmission of vibration to the object,
the hardware processor of the X-ray Talbot imaging device performs control to continue the operation to load the tensile load or the compressive load on the object by the chuck at imaging, and
the hardware processor of the X-ray Talbot imaging device estimates a distortion amount of the object during imaging from a transition of a distortion amount of the object before start of imaging, when performing imaging at a moment when a load reaches a target tensile load or a target compressive load, and sets an imaging start time when the distortion amount of the object becomes minimum on the basis of the estimated distortion amount of the object.

11. The X-ray imaging system according to claim 10, wherein the tester is provided on the object table of the X-ray Talbot imaging device in an advanceable and retractable manner with respect to the X-ray irradiation range.

12. The X-ray imaging system according to claim 10, wherein
the plurality of gratings is one-dimensional gratings, and
either the object table of the X-ray Talbot imaging device or the tester has a rotator that rotates the object around the X-ray irradiation axis.

13. The X-ray imaging system according to claim 10, wherein the hardware processor of the X-ray Talbot imaging device performs control to stop the operation to load the tensile load or the compressive load on the object by the chuck at imaging.

14. An X ray imaging system comprising:
an X-ray Talbot imaging device that has an object table, an X-ray source, a plurality of gratings, and an X-ray detector provided side by side in a direction of an X-ray irradiation axis, and irradiates the X-ray detector with an X-ray from the X-ray source through an object and the plurality of gratings to acquire a moiré image necessary for generation of a reconstructed image of the object; and
a tester that is installed on the object table, holds the object, and loads a tensile load or a compressive load on the object, wherein
the X-ray Talbot imaging device includes
a hardware processor that causes a series of imaging to be performed to acquire the moiré image necessary for generation of the reconstructed image of the object,
the tester includes:
a base part that is installed on the object table and has an X-ray transmitting part on the X-ray irradiation axis and an X-ray irradiation range around the X-ray irradiation axis; and
a chuck that is provided to protrude from the base part and arranged to sandwich the X-ray transmitting part, and loads the tensile load or the compressive load on the object,
an operation of the chuck is automatically controllable by the hardware processor of the X-ray Talbot imaging device in conjunction with the X-ray Talbot imaging device,
the X-ray Talbot imaging device and the tester are mechanically independently provided,
at least one of the object table of the X-ray Talbot imaging device and the tester has a vibration isolator for preventing transmission of vibration to the object, the hardware processor of the X-ray Talbot imaging device performs control to continue the operation to load the tensile load or the compressive load on the object by the chuck at imaging, the X-ray Talbot imaging device repeats imaging of relatively moving one of the plurality of gratings with respect to another grating to perform fringe scanning and reading an image signal by the X-ray detector according to a radiated X-ray, to acquire a plurality of the moiré images necessary for generation of the reconstructed image of the object, and the hardware processor of the X-ray Talbot imaging device divides the imaging by the fringe scanning into three or more stages when acquiring the plurality of moiré images by the fringe scanning, and loads the tensile load or the compressive load on the object by the chuck in accordance with a period of the fringe scanning.

15. The X-ray imaging system according to claim 14, wherein the tester is provided on the object table of the X-ray Talbot imaging device in an advanceable and retractable manner with respect to the X-ray irradiation range.

16. The X-ray imaging system according to claim 14, wherein the plurality of gratings is one-dimensional gratings, and either the object table of the X-ray Talbot imaging device or the tester has a rotator that rotates the object around the X-ray irradiation axis.

17. The X-ray imaging system according to claim 14, wherein the hardware processor of the X-ray Talbot imaging device performs control to stop the operation to load the tensile load or the compressive load on the object by the chuck at imaging.

* * * * *